(12) United States Patent
Salisbury (10) Patent No.: US 8,979,080 B1
(45) Date of Patent: Mar. 17, 2015

(54) APPARATUS FOR A COMPACT ADJUSTABLE PASSIVE COMPLIANT MECHANISM

(75) Inventor: Curt Michael Salisbury, Albuquerque, NM (US)

(73) Assignee: Sandia Corporation, Albuquerque, NM (US)

( * ) Notice: Subject to any disclaimer, the term of this patent is extended or adjusted under 35 U.S.C. 154(b) by 302 days.

(21) Appl. No.: 13/525,451

(22) Filed: Jun. 18, 2012

(51) Int. Cl.
    F16F 1/14    (2006.01)
    F16F 1/04    (2006.01)
    F16F 1/12    (2006.01)

(52) U.S. Cl.
    CPC ...... *F16F 1/041* (2013.01); *F16F 1/121* (2013.01)
    USPC ............ 267/277; 267/157; 267/175; 267/275

(58) Field of Classification Search
    CPC ... B60G 17/021; B60G 2500/20; F16F 1/041; F16F 1/12; F16F 1/121
    USPC .......... 267/154–157, 175, 177, 273, 275, 277
    See application file for complete search history.

(56) References Cited

U.S. PATENT DOCUMENTS

| | | | | |
|---|---|---|---|---|
| 2,622,267 | A * | 12/1952 | Peremi ............... | 16/197 |
| 3,055,689 | A * | 9/1962 | Jorgensen ............ | 292/70 |
| 4,529,179 | A | 7/1985 | Seyler | |
| 5,464,197 | A * | 11/1995 | Ecclesfield ........... | 267/155 |
| 6,471,197 | B1 * | 10/2002 | Denk et al. ........... | 267/175 |
| 6,676,118 | B2 | 1/2004 | Chou | |
| 6,681,908 | B2 | 1/2004 | Davis | |
| 6,883,635 | B2 * | 4/2005 | Lynn et al. .......... | 180/444 |
| 7,784,772 | B2 * | 8/2010 | Knopp et al. ......... | 267/74 |
| 7,992,849 | B2 | 8/2011 | Sugar et al. | |
| 2005/0006518 | A1 * | 1/2005 | Becherucci et al. .... | 242/432.2 |
| 2008/0044245 | A1 * | 2/2008 | Kouno et al. ......... | 408/124 |
| 2008/0171622 | A1 * | 7/2008 | Schever .............. | 474/135 |
| 2011/0260380 | A1 | 10/2011 | Hollander et al. | |

OTHER PUBLICATIONS

Van Ham, et al., "Compliant Actuator Designs", Retrieved at <<http://www.usna.edu/EE/ee426/ReviewArt/07_CompliantActuators.pdf>>, IEEE Robotics & Automation Magazine, Sep. 2009, pp. 81-94.

* cited by examiner

Primary Examiner — Vishal Sahni
(74) Attorney, Agent, or Firm — Daniel J. Jenkins

(57) ABSTRACT

Various technologies described herein pertain to an adjustable compliance apparatus. The adjustable compliance apparatus includes a shaft, a sleeve element, and a torsion spring. The sleeve element includes a bore there through, where the shaft is positioned through the bore of the sleeve element. Further, the torsion spring includes a plurality of coils, where the shaft is positioned through the plurality of coils. Moreover, the sleeve element is slidable in an axial direction along the shaft between the torsion spring and the shaft. Accordingly, compliance of the adjustable compliance apparatus is adjustable based on a number of the plurality of coils in contact with the sleeve element as positioned along the shaft within the torsion spring.

20 Claims, 7 Drawing Sheets

APPARATUS FOR A COMPACT ADJUSTABLE PASSIVE COMPLIANT MECHANISM

STATEMENT OF GOVERNMENTAL INTEREST

This invention was developed under contract DE-AC04-94AL85000 between Sandia Corporation and the U.S. Department of Energy. The U.S. Government has certain rights in this invention.

BACKGROUND

Apparatuses with adjustable compliance have recently become more prevalent. Such apparatuses can minimize large forces due to shocks, enable safe interactions with a user, and store and release energy in passive elastic elements, while having variable stiffness. These apparatuses can be employed in various applications where an elastic attribute is desirably variable.

An example of an application in which an apparatus with adjustable compliance can be employed is a robotic application, where such apparatus can enhance safe human-robot interaction. Another example application that can use an apparatus with adjustable compliance is a robot hand. Following this example, it can be desirable to have the robot hand be more compliant (e.g., more give, softer, less stiff, etc.) when initially grabbing an object, and then transition to becoming less compliant (e.g., less give, firmer, more stiff, etc.) to provide a firm grasp of the object. Yet, it is also to be appreciated that apparatuses with adjustable compliance are being utilized in various other types of applications.

Conventional apparatuses with adjustable compliance are oftentimes complex and costly. Other common apparatuses with adjustable compliance such as, for instance, conventional apparatuses that have a tension or compression spring with an adjustable number of active coils, are too large and oftentimes have improper geometry for various applications (e.g., due to being loaded axially in tension or compression).

SUMMARY

Described herein are various technologies that pertain to an adjustable compliance apparatus. The adjustable compliance apparatus includes a shaft, a sleeve element, and a torsion spring. The sleeve element includes a bore there through, where the shaft is positioned through the bore of the sleeve element. Further, the torsion spring includes a plurality of coils, where the shaft is positioned through the plurality of coils. Moreover, the sleeve element is slidable in an axial direction along the shaft between the torsion spring and the shaft. Accordingly, compliance of the adjustable compliance apparatus is adjustable based on a number of the plurality of coils in contact with the sleeve element as positioned along the shaft within the torsion spring.

In accordance with various embodiments, the adjustable compliance apparatus can include a pulley coupled to an end of the shaft. Moreover, angular correspondence can be maintained between the shaft and the sleeve element. Further, the sleeve element can include external threading. For instance, the pulley can be rotated, which can cause the shaft to rotate the sleeve element. Rotation of the sleeve element can cause the external threading of the sleeve element to either thread into the torsion spring or unthread from the torsion spring while the sleeve element slides in an axial direction along the shaft between the torsion spring and the shaft; thus, the number of coils of the torsion spring in contact with the sleeve element can be adjusted, which can cause the compliance of the adjustable compliance apparatus to be adjusted.

In one or more embodiments set forth herein, a system that controls compliance can include the adjustable compliance apparatus. Such system can include a sensor, a motor, a control unit, and a belt. For instance, the control unit can be in communication with the sensor and the motor. Moreover, the belt can be attached to the motor and a pulley of the adjustable compliance apparatus. Accordingly, the sensor can output a signal to the control unit responsive to sensing a condition. The control unit can output a control signal to the motor responsive to receiving the signal from the sensor. Further, the motor can be actuated to move the belt responsive to receiving the control signal from the control unit, which can cause the belt to rotate the pulley, the pulley to rotate the shaft, the shaft to rotate the sleeve element, and the sleeve element to either thread into the torsion spring or unthread from the torsion spring while the sleeve element translates in an axial direction along the shaft between one or more of the plurality of coils of the torsion spring and the shaft.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Various technologies pertaining to adjusting compliance of an apparatus having controllable compliance are now described with reference to the drawings, wherein like reference numerals are used to refer to like elements throughout.

In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

As set forth herein, an adjustable compliance apparatus is provided. The adjustable compliance apparatus can include a shaft, a sleeve element, and a torsion spring. The sleeve element is slidable along the shaft in an axial direction between the torsion spring and the shaft. Accordingly, a number of active coils of the torsion spring can be controlled based upon a position of the sleeve element relative to the torsion spring and shaft. The adjustable compliance apparatus described herein can be more compact and less complex than conventional apparatuses that provide for adjustable compliance. For instance, as compared to some conventional apparatuses that include a tension or compression spring with an adjustable number of active coils, the adjustable compliance apparatus set forth herein that includes a torsion spring can be more compact (e.g., in the spring direction since the torsion spring is not loaded axially), while providing a geometry that can be used in different applications.

Figure 1:
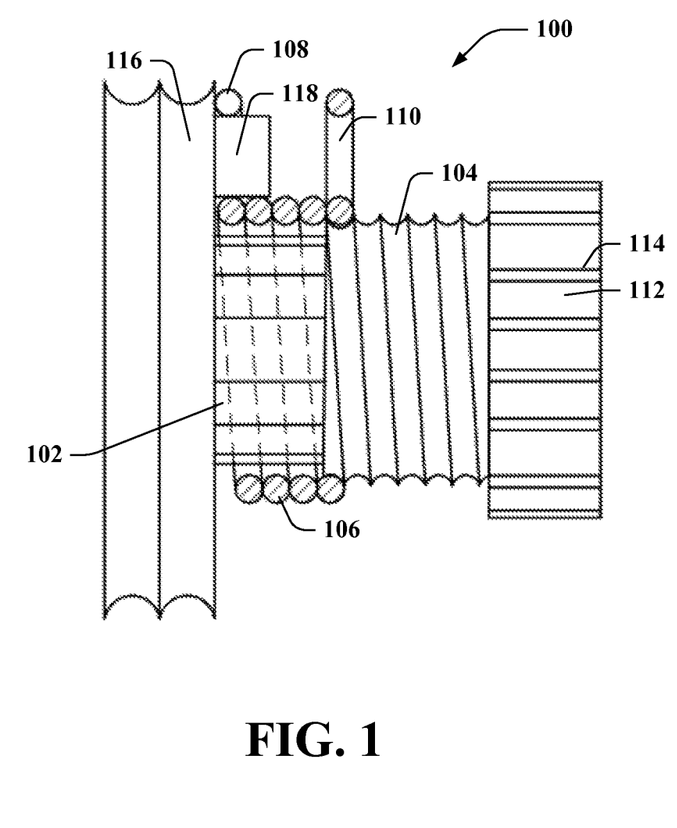
FIG. 1 illustrates a front view of an exemplary adjustable compliance apparatus.

Referring now to the drawings, FIG. 1 illustrates a front view of an exemplary adjustable compliance apparatus 100. The adjustable compliance apparatus 100 is a passive compliant mechanism that includes an elastic element (e.g., a spring) that can store energy. The adjustable compliance apparatus 100 has adjustable compliance, which can also be referred to as adjustable stiffness. The compliance of the adjustable compliance apparatus 100 can be controlled by modifying an effective physical structure of the spring to achieve variations in stiffness.

More particularly, the adjustable compliance apparatus 100 includes a shaft 102, a sleeve element 104, and a torsion spring 106. The torsion spring 106 provides resistance to a torque or twisting action. The torsion spring 106 includes a plurality of coils. The torsion spring 106 has a shape of a helix. In the depicted example of FIG. 1, the torsion spring 106 is shown to have four coils; however, it is to be appreciated that the torsion spring 106 can include substantially any number of coils greater or less than four. As illustrated in FIG. 1, portions of the coils of the torsion spring 106 are cut away to expose the shaft 102, and outlines of the cut away portions of the coils are represented by dotted lines. In a free state, the coils of the torsion spring 106 can be either touching or within close proximity of each other.

The torsion spring 106 also includes two legs (e.g., ends): a leg 108 and a leg 110 (collectively referred to as legs 108-110). The torque or twisting action can be applied to the legs 108-110. The legs 108-110 can be hook-shaped; yet, it is to be appreciated that substantially any design of the legs 108-110 of the torsion spring 106 is intended to fall within the scope of the hereto appended claims.

Sideways forces applied to the legs 108-110 can cause twisting about an axis of the torsion spring 106, thereby causing active coils to twist tighter. Moreover, the torsion spring 106 is designed to resist twist or rotation forces. For instance, when the legs 108-110 are rotated around the axis of the torsion spring 106, the torsion spring 106 tries to push back to a free state.

Further, the torsion spring 106 can be formed from substantially any type of wire or rod. According to an example, the torsion spring 106 can be formed from round wire. By way of another example, the torsion spring 106 can be formed from rectangular wire. However, it is to be appreciated that the claimed subject matter is not limited to the foregoing examples.

The sleeve element 104 of the adjustable compliance apparatus 100 includes a bore there through. Moreover, the shaft 102 is positioned through the bore of the sleeve element 104. The shaft 102 is also positioned through the plurality of coils of the torsion spring 106.

The sleeve element 104 is slidable in an axial direction along the shaft 102 between the torsion spring 106 and the shaft 102. Thus, the sleeve element 104 can slide along the shaft 102 into the torsion spring 106 or out from the torsion spring 106. Further, compliance of the adjustable compliance apparatus 100 is adjustable based on a number of the plurality of the coils in contact with the sleeve element 104 as positioned along the shaft 102 within the torsion spring 106. Compliance of the adjustable compliance apparatus 100 and the number of the plurality of the coils in contact with the sleeve element 104 are inversely proportional. Accordingly, the number of coils from the plurality coils of the torsion spring 106 that are in contact with the sleeve element 104 can be adjusted by translation of the sleeve element 104 along the shaft 102 between the torsion spring 106 and the shaft 102.

The sleeve element 104 can be made of a material that enables the sleeve element 104 to more readily slide across the shaft 102. For example, the sleeve element 104 can be made of polytetrafluoroethylene. However, it is also contemplated that the sleeve element 104 can be made of a different material with a low coefficient of friction against the shaft 102 (e.g., a material pairing for the sleeve element 104 and the shaft 102 can have low friction such as steel on brass, etc.). Moreover, the sleeve element 104 has an external diameter that fits within an unloaded internal diameter (e.g., free length) of a coil of the torsion spring 106, where the sleeve element 104 contacts the coil and causes the coil to be inactive (e.g., since the coil is unable to tighten due to the positioning of the sleeve element 104 there within); thus, the sleeve element 104 can be positioned within the unloaded internal diameter of an adjustable number of the coils of the torsion spring 106, thereby contacting such coils and causing these coils to be inactive.

As shown in FIG. 1, the sleeve element 104 is positioned along the shaft 102 to be in contact with a portion of an end coil of the torsion spring 106 while not being in contact with a remainder of the coils of the torsion spring 106. Further, the sleeve element 104 can be slid along the shaft 102 from the position depicted in FIG. 1 into the torsion spring 106, thereby causing the sleeve element 104 to be in contact with more than one coil of the torsion spring 106. Moreover, while not shown, it is contemplated that the sleeve element 104 can be slid to a position along the shaft 102 so as to not contact any of the coils of the torsion spring 106.

A coil of the torsion spring 106 that is not in contact with the sleeve element 104 is an active coil, and a coil of the torsion spring 106 that is in contact with the sleeve element 104 is an inactive coil. An active coil is a coil which is free to deflect under load, and an inactive coil is a coil that does not deflect under load. For instance, when the sleeve element 104 is positioned between a particular coil of the torsion spring 106 and the shaft 102, the particular coil is an inactive coil. Further, when the sleeve element 104 is not positioned between the particular coil of the torsion spring 106 and the shaft 102, the particular coil is an active coil.

Moreover, the adjustable compliance apparatus 100 includes a pulley 112 coupled with a first end of the shaft 102. The pulley 112 can include a plurality of teeth, such as a tooth 114, along an exterior surface of the pulley 112. Rotation of the pulley 112 can cause rotation of the shaft 102 (e.g., about an axis of the shaft 102).

Further, the adjustable compliance apparatus 100 includes a fixed element 116 coupled with a second end of the shaft 102. The fixed element 116 remains stationary, while the shaft 102 and the pulley 112 are rotatable. Thus, the shaft 102 (and the pulley 112) can be rotated relative to the fixed element 116. The fixed element 116 further includes a connection element 118. The leg 108 of the torsion spring 106 is coupled to the connection element 118. Accordingly, a position of the leg 108 remains stationary relative to the fixed element 116 due to the coupling with the connection element 118.

In the example shown in FIG. 1, the sleeve element 104 comprises external threading that follows a pitch of the torsion spring 106. Thus, from the position of the sleeve element 104 relative to the shaft 102 and the torsion spring 106 depicted in FIG. 1, the sleeve element 104 can be threaded into the torsion spring 106 to increase the number of coils of the torsion spring 106 in contact with the sleeve element 104. However, it is to be appreciated that the claimed subject matter is not limited to the sleeve element 104 having external threading.

As noted above, rotation of the pulley 112 can cause rotation of the shaft 102. Rotation of the shaft 102 can cause rotation of the sleeve element 104 (e.g., torque can be transferred from the shaft 102 to the sleeve element 104 via external splines, a key, ridges, teeth, etc. on the shaft 102 that mesh with internal splines, a keyway, grooves, etc. in the bore through the sleeve element 104). Moreover, the shaft 102 and the sleeve element 104 can rotate with equivalent angular frequencies (e.g., angular correspondence between the shaft 102 and the sleeve element 104 can be maintained) while the sleeve element 104 slides in the axial direction along the shaft 102. Further, the sleeve element 104 and the shaft 102 can rotate relative to the torsion spring 106 to either thread the sleeve element 104 into the torsion spring 106 or unthread the sleeve element 104 from the torsion spring 106. For instance, the sleeve element 104 can slide into the torsion spring 106 to increase the number of the plurality of coils of the torsion spring 106 in contact with the sleeve element 104 when the pulley 112 is rotated in a first direction, and the sleeve element 104 can slide out of the torsion spring 106 to decrease the number of the plurality of coils of the torsion spring 106 in contact with the sleeve element 104 when the pulley is rotated in a second direction (e.g., opposite the first direction). It is contemplated, however, that in other embodiments the sleeve element 104 can translate along the shaft 102 in the axial direction without rotation about the shaft 102.

Figure 2:
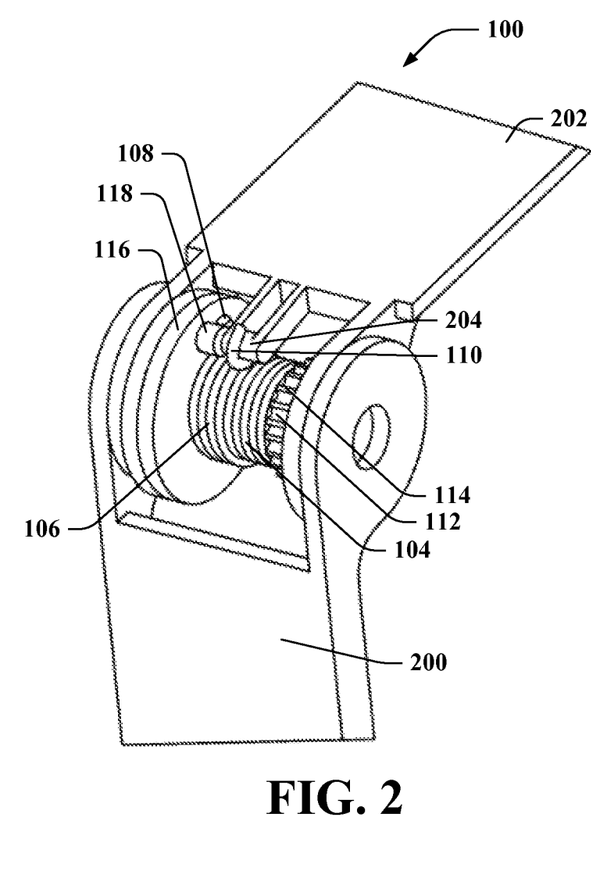
FIG. 2 illustrates a perspective view of the exemplary adjustable compliance apparatus of FIG. 1.

Turning to FIG. 2, illustrated is a perspective view of the exemplary adjustable compliance apparatus 100 with the sleeve element 104 at the position along the shaft 102 depicted in FIG. 1. The adjustable compliance apparatus 100 can further include a link 200 and a link 202 (collectively referred to as links 200-202). The link 200 can apply a force to the leg 108 of the torsion spring 106, and the link 202 can apply a force to the leg 110 of the torsion spring 106. When the adjustable compliance apparatus 100 is loaded such that the links 200-202 respectively apply forces at the legs 108-110, the torsion spring 106 can be twisted about its axis (e.g., the axis of the shaft 102), causing the active coils of the torsion spring 106 to tighten. Accordingly, compliance is increased (stiffness is decreased) as the number of active coils of the torsion spring 106 is increased, while compliance is decreases (stiffness is increased) as the number of active coils of the torsion spring 106 is decreased.

As noted above, the leg 108 is coupled to the connection element 118 of the fixed element 116. The fixed element 116 remains stationary with respect to the link 200 (e.g., angular correspondence between the fixed element 116 and the link 200 is maintained) while the link 200 and the link 202 are rotated relative to each other about the axis of the torsion spring 106. Moreover, the link 202 includes a connection element 204. The leg 110 of the torsion spring 106 is coupled to the connection element 204.

In accordance with an illustration, the link 200 and the link 202 can be rotated relative to each other about the axis of the torsion spring 106. Following this illustration, when loaded, the link 200 can cause a force to be applied to the leg 108 of the torsion spring, and the link 202 can cause a force to be applied to the leg 110 of the torsion spring 106, which leads to the torsion spring 106 being twisted about its axis such that active coils of the torsion spring 106 tighten (e.g., as compared to a free state of the torsion spring 106 when not loaded).

Figure 3:
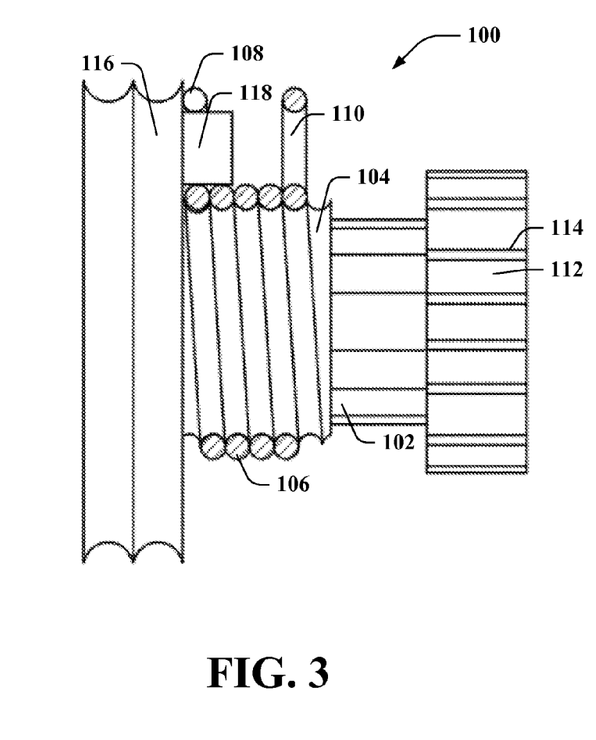
FIG. 3 illustrates another front view of the exemplary adjustable compliance apparatus of FIG. 1 with a sleeve element slid along a shaft and threaded into a torsion spring.
Figure 4:
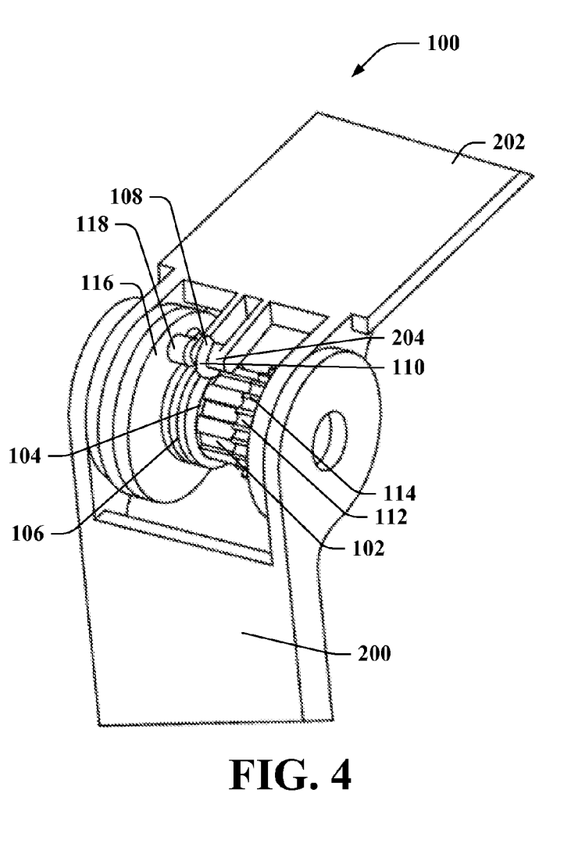
FIG. 4 illustrates another perspective view of the exemplary adjustable compliance apparatus of FIG. 1 with the sleeve element at the position depicted in FIG. 3.

Now referring to FIG. 3, illustrated is another front view of the exemplary adjustable compliance apparatus 100. As depicted in FIG. 3, the sleeve element 104 has been slid along the shaft 102 from the position shown in FIGS. 1-2 and threaded into the torsion spring 106. More particularly, as illustrated in FIG. 3, the sleeve element 104 is in contact with the four coils of the torsion spring 106. Thus, with the sleeve element 104 in the position shown in FIG. 3 relative to the torsion spring 106, the four coils of the torsion spring 106 are inactive. Accordingly, compliance of the adjustable compliance apparatus 100 is lower (and stiffness is higher) when the sleeve element 104 is in the position shown in FIG. 3 as compared to in the position shown in FIGS. 1-2. Moreover, FIG. 4 illustrates a perspective view of the exemplary adjustable compliance apparatus 100 with the sleeve element 104 at the position along the shaft 102 depicted in FIG. 3.

Figure 5:
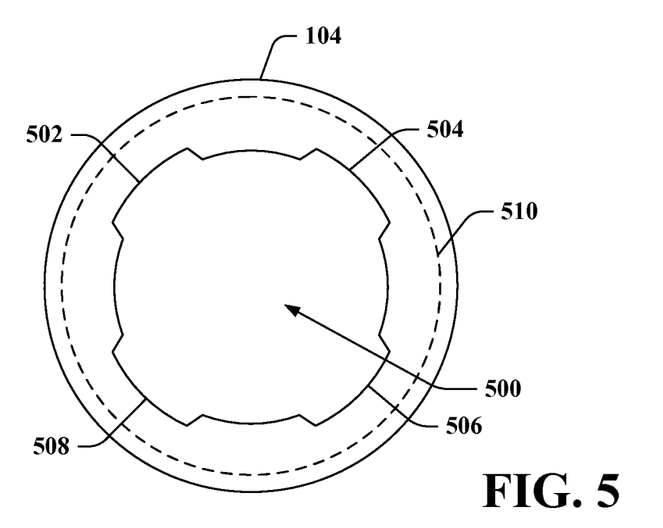
FIG. 5 illustrates a side view of the sleeve element of the adjustable compliance apparatus of FIG. 1.

Now referring to FIG. 5, illustrated is a side view of the sleeve element 104 of the adjustable compliance apparatus 100 of FIG. 1. The sleeve element 104 includes a bore 500 there through. Further, the sleeve element 104 includes internal splines, namely, an internal spline 502, an internal spline 504, an internal spline 506, and an internal spline 508 (collectively referred to as internal splines 502-508). The internal splines 502-508 are through the bore 500.

Moreover, the sleeve element 104 includes external threading 510. The external threading 510 can follow a pitch of the torsion spring 106 of the adjustable compliance apparatus 100; thus, the external threading 510 can have thread characteristics that are substantially similar as the torsion spring 106. The external threading 510 of the sleeve element 104 can improve coil following; however, it is contemplated that the sleeve element 104 need not include the external threading 510 in various embodiments. By way of another example, the sleeve element 104 can include the external threading 510 while also including a tapered leading edge; yet, the claimed subject matter is not limited to such example.

Figure 6:
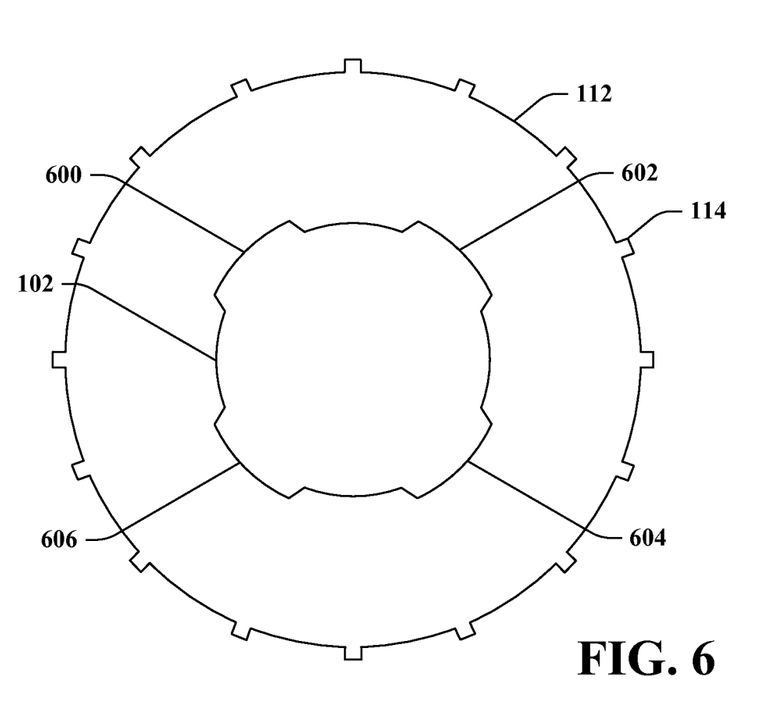
FIG. 6 illustrates a side view of a shaft and a pulley of the adjustable compliance apparatus of FIG. 1.

Turning to FIG. 6, illustrated is a side view of the shaft 102 and the pulley 112 of the adjustable compliance apparatus 100 of FIG. 1. As described above, the pulley 112 includes a plurality of teeth, such as the tooth 114, along an exterior surface thereof. Moreover, the shaft 102 includes external splines, namely, an external spline 600, an external spline 602, an external spline 604, and an external spline 606 (collectively referred to as external splines 600-606).

Referring to both FIGS. 5-6, the external splines 600-606 of the shaft 102 mate with the internal splines 502-508 of the sleeve element 104. Rotation of the pulley 112 causes rotation of the shaft 102. When the shaft 102 is rotated, the external splines 600-606 of the shaft 102 transfer torque to the internal splines 502-508 of the sleeve element 104, while maintaining an angular correspondence between the shaft 102 and the sleeve element 104. While four external splines 600-606 and four internal splines 502-508 are shown, it is contemplated that the shaft 102 and sleeve element 104 can include more or less than four splines, respectively. Moreover, it is to be appreciated that any type of spline is intended to fall within the scope of the hereto appended claims (e.g., parallel key spline, involute spline, crowned spline, serrations, helical splines, ball splines, etc.).

Figure 7:
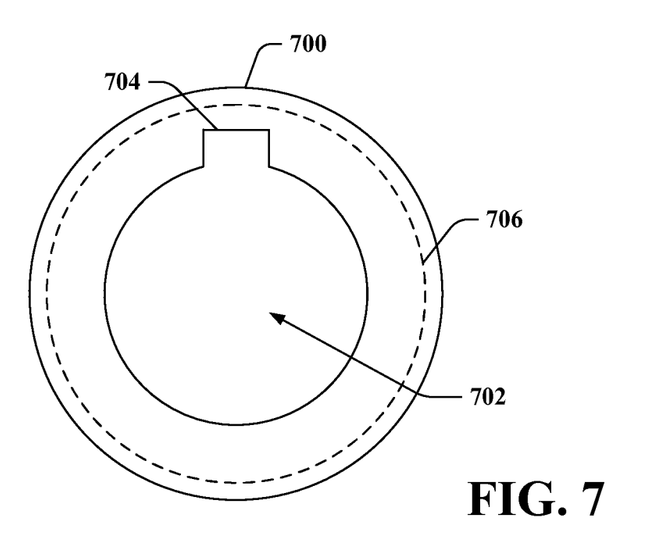
FIGS. 7-8 illustrate side views of another exemplary sleeve element and shaft that can be included in an adjustable compliance apparatus in various embodiments.
Figure 8:
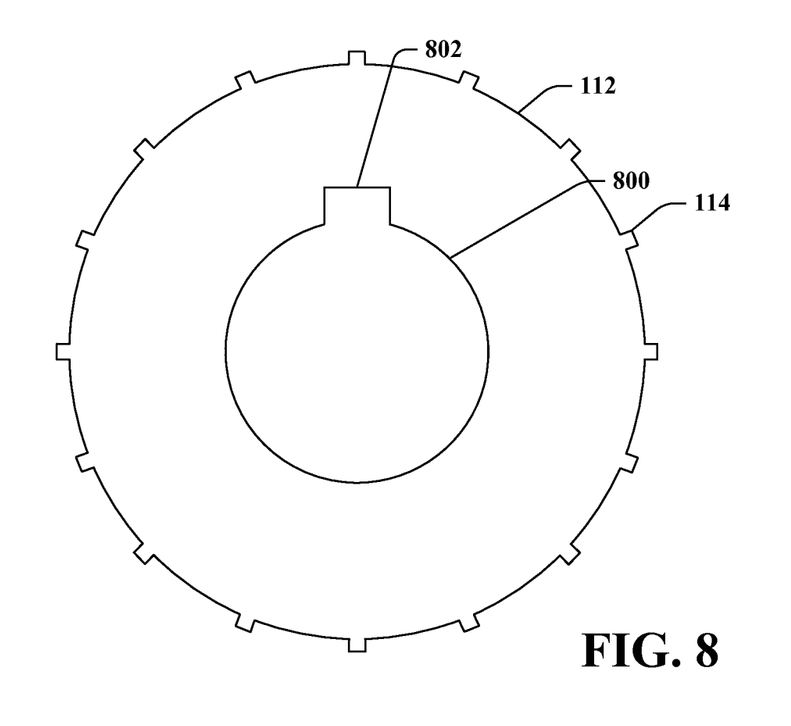

Turning to FIGS. 7-8, illustrated are side views of another exemplary sleeve element 700 (shown in FIG. 7) and shaft 800 (shown in FIG. 8) that can be included in an adjustable compliance apparatus in various embodiments. The sleeve element 700, as depicted in FIG. 7, includes a bore 702 there through. Moreover, the sleeve element 700 includes a keyway 704 through the bore 702. Further, the sleeve element 700 includes external threading 706; yet, it is contemplated that the claimed subject matter is not so limited.

FIG. 8 depicts the shaft 800 and the pulley 112. The shaft 800 includes a key 802. Accordingly, the key 802 of the shaft 800 mates with the keyway 704 of the sleeve element 700. Similar to the example set forth in FIGS. 5-6, rotation of the pulley 112 causes rotation of the shaft 800, and when the shaft 800 is rotated, the key 802 of the shaft 800 transfers torque to the keyway 704 of the sleeve element 700, while maintaining an angular correspondence between the shaft 800 and the sleeve element 700.

Figure 9:
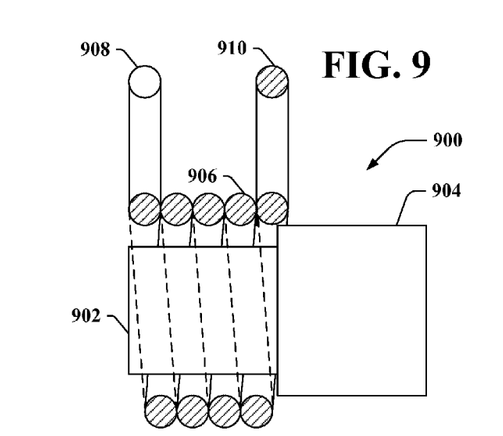
FIGS. 9-11 illustrate front views of another exemplary adjustable compliance apparatus.
Figure 10:
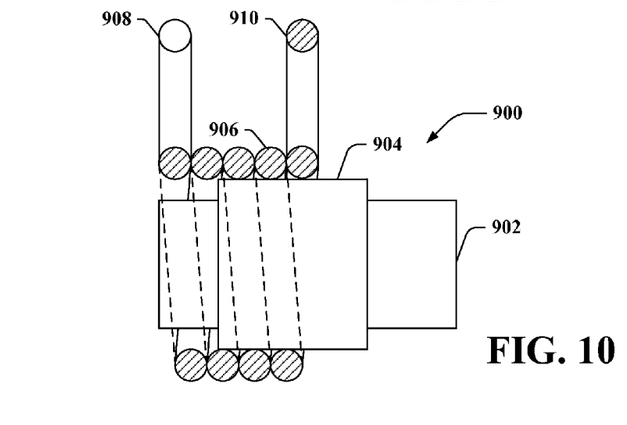
Figure 11:
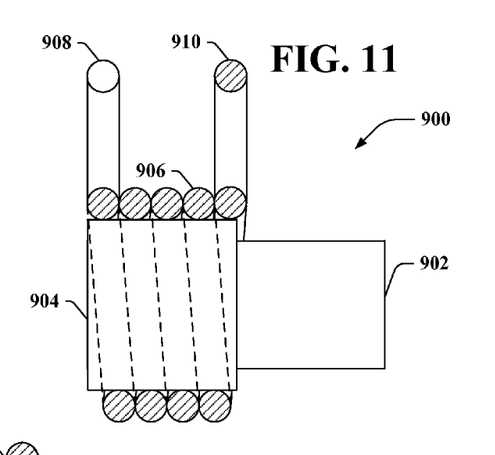

With reference to FIGS. 9-11, illustrated are front views of another exemplary adjustable compliance apparatus 900. The adjustable compliance apparatus 900 includes a shaft 902, a sleeve element 904, and a torsion spring 906. The torsion spring 906 includes a plurality of coils, an end 908, and an end 910. Moreover, the torsion spring 906 can be substantially similar to the torsion spring 106. Although not shown, it is to be appreciated that the adjustable compliance apparatus 900 can further include a pulley (e.g., the pulley 112), a fixed element (e.g., the fixed element 116), links respectively coupled with the end 908 and the end 910 (e.g., the links 200-202), or a combination thereof.

The sleeve element 904 can have a cylindrical exterior surface that lacks external threading. Accordingly, the sleeve element 904 can be slidable in an axial direction along the shaft 902 between the torsion spring 906 and the shaft 902. For instance, FIG. 9 shows the sleeve element 904 being at a position along the shaft 902 outside of the coils of the torsion spring 906. Further, through simple translation, the sleeve element 904 can be slid into the torsion spring 906 as shown in FIG. 10 to be in contact with a subset of the coils of the torsion spring 906. The sleeve element 904 can be further slid into the torsion spring as shown in FIG. 11 to be in contact with all the coils of the torsion spring 906. Accordingly, as the sleeve element 904 is slid into the torsion spring, compliance can be decreased. Moreover, as the sleeve element 904 is slid out from the torsion spring 906, compliance can be increased.

According to an example, the shaft 902 need not include splines, a key, or the like. Following this example, angular correspondence between the shaft 902 and the sleeve element 904 can vary. By way of another example, the shaft 902 can include splines, a key, or the like (and the sleeve element 904 can include corresponding splines, a keyway, etc.) as set forth herein; accordingly, angular correspondence between the shaft 902 and the sleeve element 904 can be maintained.

Figure 12:
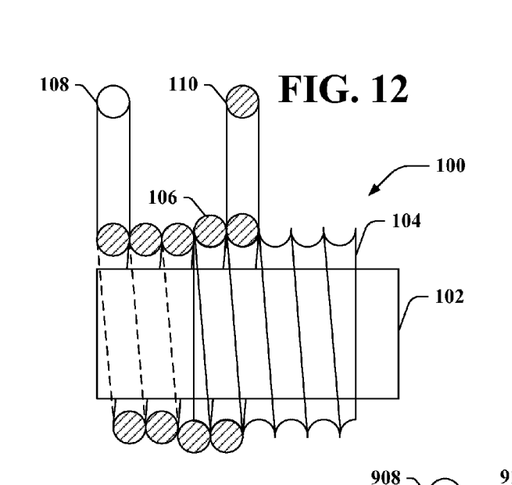
FIG. 12 illustrates another front view of the exemplary adjustable compliance apparatus of FIG. 1.

With reference to FIG. 12, illustrated is another front view of the exemplary adjustable compliance apparatus 100 of FIG. 1. As depicted in FIG. 12, the sleeve element 104 is positioned along the shaft 102 to be in contact with a subset of the coils of the torsion spring 106. Accordingly, the sleeve element 104 causes the coils of the torsion spring 106 with which it is in contact to be inactive. Further, a remainder of the coils of the torsion spring 106 that are not in contact with the sleeve element 104 are active coils. As shown in FIG. 12, the coils of the torsion spring 106 that are not in contact with the sleeve element 104 (e.g., the active coils) can tighten when forces are applied at the legs 108-110 of the torsion spring 106.

Figure 13:
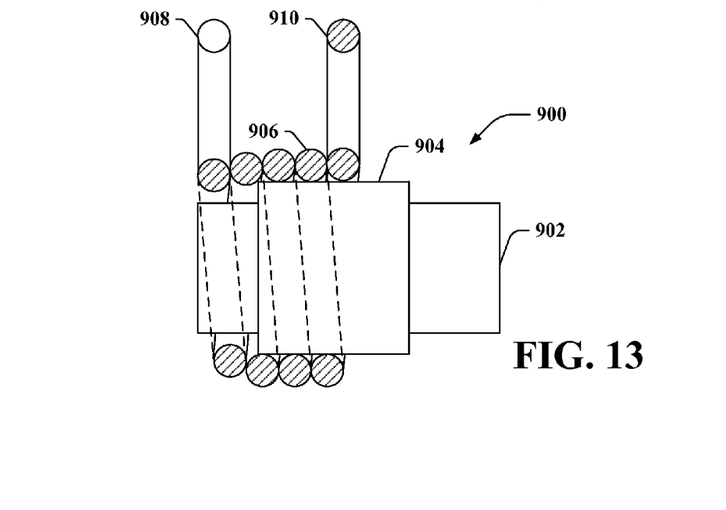
FIG. 13 illustrates another front view of the exemplary adjustable compliance apparatus of FIG. 9.

Turning to FIG. 13, illustrated is another front view of the exemplary adjustable compliance apparatus 900 of FIG. 9. FIG. 13 depicts the sleeve element 104 being positioned along the shaft 902 to be in contact with a subset of the coils of the torsion spring 906 (e.g., similar to FIG. 10). Again, coils of the torsion spring 906 in contact with the sleeve element 904 are inactive, while coils of the torsion spring 906 not in contact with the sleeve element 904 are active. As illustrated in FIG. 13, the coils of the torsion spring 906 that are not in contact with the sleeve element 904 (e.g., the active coils) can tighten when forces are applied at the legs 908-910 of the torsion spring 906.

Figure 14:
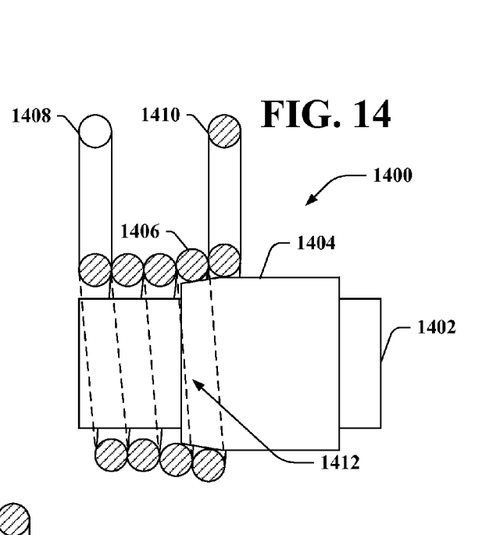
FIG. 14 illustrates a front view of another exemplary adjustable compliance apparatus.

Now referring to FIG. 14, illustrated is a front view of another exemplary adjustable compliance apparatus 1400. The adjustable compliance apparatus 1400 includes a shaft 1402, a sleeve element 1404, and a torsion spring 1406. The shaft 1402 can be substantially similar to the shaft 102, the shaft 800, and/or the shaft 902. Moreover, the torsion spring 1406 can be substantially similar to the torsion spring 106 and/or the torsion spring 906. For instance, the torsion spring 1406 includes a leg 1408 and a leg 1410.

Moreover, the sleeve element 1404 includes a tapered leading edge 1412. The tapered leading edge 1412 can provide a gradual transition from free to solid length geometries. The tapered leading edge 1412 can enable the sleeve element 1404 to be wedged in place when the active coils of the torsion spring 1406 are in at least a partially compressed state. Thus, the tapered leading edge 1412 can expand a coil that has been tightened to allow the sleeve element 1404 to be slid into such coil (e.g., other active coil(s) can further compress to account for the expansion of such coil, links can be moved to allow for the expansion of the coil, etc.). Further, it is contemplated that a tapered leading edge, similar to the tapered leading edge 1412, can be included in the sleeve element 104 (e.g., a sleeve element that includes external threading). Yet, it is also to be appreciated that a sleeve element without a tapered leading edge (e.g., the sleeve element 104, the sleeve element 904, etc.) can also be wedged in place when the active coils of the torsion spring 1406 are in at least a partially compressed state (e.g., due to being formed of a material with a low coefficient of friction such as polytetrafluoroethylene).

Figure 15:
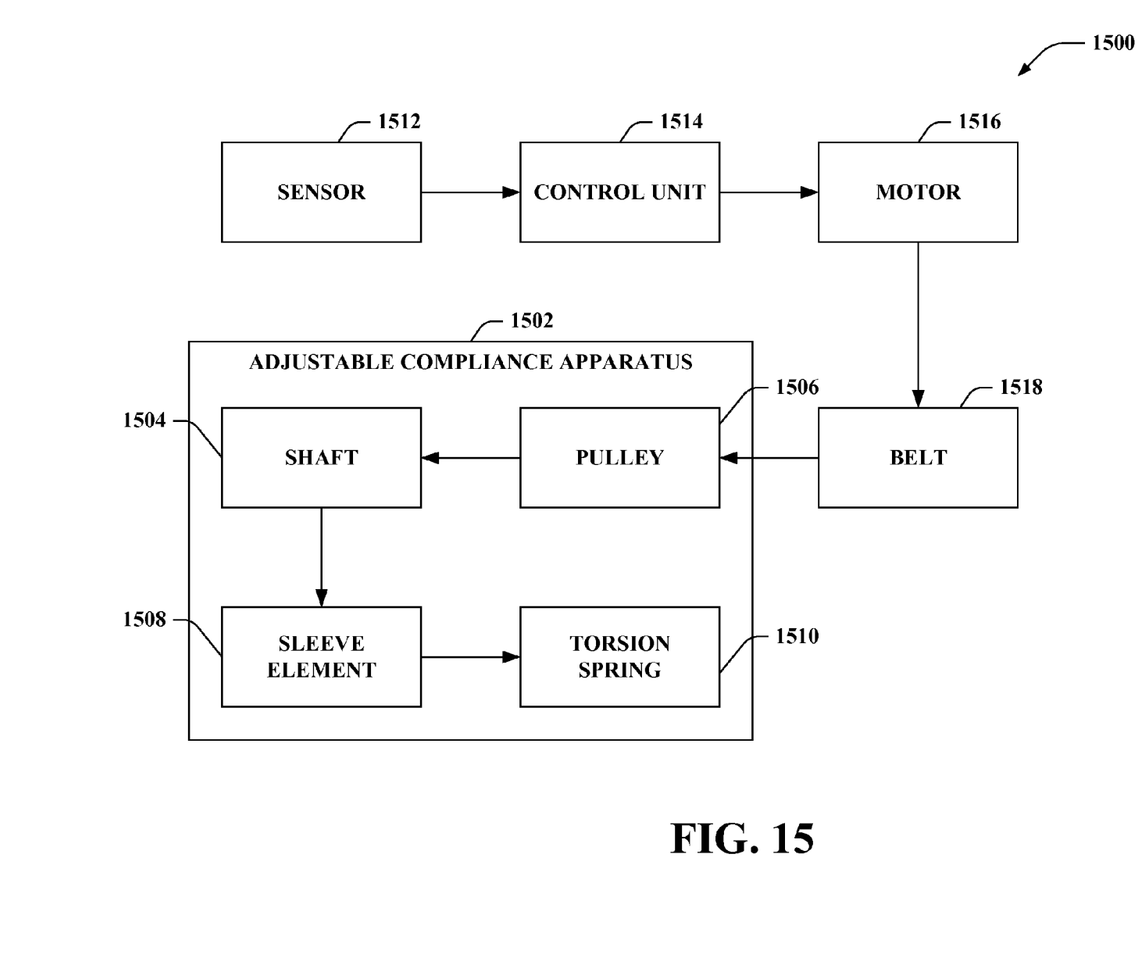
FIG. 15 illustrates a block diagram of an exemplary system that controls compliance of an adjustable compliance apparatus.

Turning to FIG. 15, illustrated is a block diagram of an exemplary system 1500 that controls compliance of an adjustable compliance apparatus 1502. The adjustable compliance apparatus 1502 included in the system 1500 comprises a shaft 1504 having a first end, a pulley 1506 coupled with the first end of the shaft 1504, a sleeve element 1508, and a torsion spring 1510. The sleeve element 1508 includes a bore there through. Moreover, the shaft 1504 is positioned through the bore of the sleeve element 1508. Further, the torsion spring 1510 includes a plurality of coils, with the shaft 1504 positioned through the plurality of coils of the torsion spring 1510.

According to an example, the sleeve element 1508 can include external threading that follows a pitch of the torsion spring 1510. Moreover, the sleeve element 1508 can have an external diameter that fits within an unloaded internal diameter of a coil from the plurality of coils of the torsion spring 1510, where the sleeve element 1508 can contact the coil and cause such coil to be inactive.

The sleeve element 1508 is slidable in an axial direction along the shaft 1504 while an angular correspondence is maintained between the shaft 1504 and the sleeve element 1508. According to an example, the shaft 1504 can include external splines and the sleeve element 1508 can include internal splines through the bore. Following this example, the external splines of the shaft 1504 can mate with the internal splines of the sleeve element 1508. By way of another example, the shaft 1504 can include a key and the sleeve element 1508 can include a keyway through the bore. In accordance with this example, the key of the shaft 1504 can mate with the keyway of the sleeve element 1508. However, it is contemplated that the claimed subject matter is not limited to the foregoing examples.

The system 1500 further includes a sensor 1512, a control unit 1514, a motor 1516, and a belt 1518. The control unit 1514 is in communication with the sensor 1512 and the motor 1516. Moreover, the belt 1518 is attached to the motor 1516 and the pulley 1506 of the adjustable compliance apparatus 1502 (e.g., the belt 1518 can mate with teeth along an exterior surface of the pulley 1506).

The sensor 1512 can output a signal to the control unit 1514 responsive to sensing a condition. For instance, the condition can correspond to a target compliance of the adjustable compliance apparatus 1502. By way of example, the condition sensed by the sensor 1512 can be a sensed need for the target compliance; however, it is to be appreciated that the sensor 1512 can detect substantially any condition that can correspond to the target compliance, which can be signaled to the control unit 1514.

Moreover, the control unit 1514 can output a control signal to the motor 1516 responsive to receiving the signal from the sensor 1512. The motor 1516 can be actuated to move the belt 1518 responsive to receiving the control signal from the control unit 1514. Movement of the belt 1518 by the motor 1516 can cause the belt 1518 to rotate the pulley 1506 (e.g., the belt 1518 can drive the pulley 1506), the pulley 1506 to rotate the shaft 1504, the shaft 1504 to rotate the sleeve element 1508, and the sleeve element 1508 to either thread into the torsion spring 1510 or unthread from the torsion spring 1510 while the sleeve element 1508 translates in an axial direction along the shaft 1504 between one or more of the plurality of coils of the torsion spring 1510 and the shaft 1504.

Accordingly, compliance of the adjustable compliance apparatus 1502 can be adjustable based on a number of the plurality of coils of the torsion spring 1510 in contact with the sleeve element 1508 as positioned along the shaft 1504 within the torsion spring 1504. For instance, the sleeve element 1508 can be threaded into the torsion spring 1510 to increase the number of coils in contact with the sleeve element 1508 when the pulley 1506 is rotated in a first direction. Alternatively, when the pulley 1506 is rotated in a second direction (e.g., opposite the first direction), the sleeve element 1508 can be unthreaded from the torsion spring 1510 to decrease the number of coils in contact with the sleeve element 1508.

Further, as used herein, the term "exemplary" is intended to mean "serving as an illustration or example of something."

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. An adjustable compliance apparatus, comprising:
   a shaft;
   a sleeve element that comprises a bore there through, the shaft positioned through the bore of the sleeve element;
   a torsion spring that comprises a plurality of coils, the shaft positioned through the plurality of coils; and
   a space between the shaft and the plurality of coils;
   wherein the sleeve element is slidable in an axial direction along the shaft between the torsion spring and the shaft so as to fill or unfill the space between the shaft and the plurality of coils by rotating the sleeve element around the shaft so as to adjust the amount of contact between the sleeve element and the plurality of coils, and wherein compliance of the adjustable compliance apparatus is adjustable based on a number of the plurality of the coils in contact with the sleeve element as positioned along the shaft within the torsion spring.

2. The adjustable compliance apparatus of claim 1, wherein the shaft comprises external splines and the sleeve element comprises internal splines through the bore, and wherein the external splines of the shaft mate with the internal splines of the sleeve element.

3. The adjustable compliance apparatus of claim 1, wherein the shaft comprises a key and the sleeve element comprises a keyway through the bore, and wherein the key of the shaft mates with the keyway of the sleeve element.

4. The adjustable compliance apparatus of claim 1, wherein the sleeve element and the shaft rotate with equivalent angular frequencies while the sleeve element slides in the axial direction along the shaft.

5. The adjustable compliance apparatus of claim 4, wherein the sleeve element and shaft rotate relative to the torsion spring to one of thread the sleeve element into the torsion spring or unthread the sleeve element from the torsion spring.

6. The adjustable compliance apparatus of claim 1, further comprising a pulley coupled with one end of the shaft.

7. The adjustable compliance apparatus of claim 6, wherein the pulley further comprises a plurality of teeth along an exterior surface of the pulley.

8. The adjustable compliance apparatus of claim 6, wherein the sleeve element slides into the torsion spring to increase the number of the plurality of the coils in contact with the sleeve element when the pulley is rotated in a first direction, and wherein the sleeve element slides out of the torsion spring to decrease the number of the plurality of the coils in contact with the sleeve element when the pulley is rotated in a second direction.

9. The adjustable compliance apparatus of claim 1, wherein the compliance of the adjustable compliance apparatus and the number of the plurality of the coils in contact with the sleeve element are inversely proportional.

10. The adjustable compliance apparatus of claim 1, wherein the sleeve element comprises external threading that follows a pitch of the torsion spring.

11. The adjustable compliance apparatus of claim 1, wherein the sleeve element comprises a tapered leading edge.

12. The adjustable compliance apparatus of claim 1, wherein the sleeve element is made of polytetrafluoroethylene.

13. The adjustable compliance apparatus of claim 1, wherein the sleeve element has an external diameter that fits within an unloaded internal diameter of a coil from the plurality of coils, wherein the sleeve element contacts the coil and causes the coil to be inactive.

14. A system that controls compliance, comprising:
an adjustable compliance apparatus, comprising:
a shaft having a first end;
a pulley coupled with the first end of the shaft;
a sleeve element that comprises a bore there through, the shaft positioned through the bore of the sleeve element; and
a torsion spring that comprises a plurality of coils, the shaft positioned through the plurality of coils;
a space between the shaft and the plurality of coils;
a sensor;
a motor;
a control unit that is in communication with the sensor and the motor; and
a belt attached to the motor and the pulley;
wherein the sensor outputs a signal to the control unit responsive to sensing a condition, wherein the control unit outputs a control signal to the motor responsive to receiving the signal from the sensor, wherein the motor is actuated to move the belt responsive to receiving the control signal from the control unit, causing the belt to rotate the pulley, the pulley to rotate the shaft, the shaft to rotate the sleeve element, and the sleeve element to one of thread into the torsion spring or unthread from the torsion spring while the sleeve element translates in an axial direction along the shaft between one or more of the plurality of coils of the torsion spring and the shaft so as to fill or unfill the space between the shaft and the plurality of coils by rotating the sleeve element around the shaft so as to adjust the amount of contact between the sleeve element and the plurality of coils.

15. The system of claim 14, wherein the compliance of the adjustable compliance apparatus is adjustable based on a number of the plurality of the coils in contact with the sleeve element as positioned along the shaft within the torsion spring.

16. The system of claim 14, wherein the shaft comprises external splines and the sleeve element comprises internal splines through the bore, and wherein the external splines of the shaft mate with the internal splines of the sleeve element.

17. The system of claim 14, wherein the condition corresponds to a target compliance of the adjustable compliance apparatus.

18. The system of claim 14, wherein the sleeve element comprises external threading that follows a pitch of the torsion spring.

19. The system of claim 14, wherein the sleeve element has an external diameter that fits within an unloaded internal diameter of a coil from the plurality of coils, wherein the sleeve element contacts the coil and causes the coil to be inactive.

20. An adjustable compliance apparatus, comprising:
a shaft comprising external splines, the shaft having a first end;
a pulley coupled with the first end of the shaft;
a sleeve element that comprises a bore there through and external threading, the sleeve element further comprises internal splines through the bore, wherein the shaft is positioned through the bore of the sleeve element with the external splines of the shaft mating with the internal splines of the sleeve element;
a torsion spring that comprises a plurality of coils, wherein the shaft is positioned through the plurality of coils; and
a space between the shaft and the plurality of coils;
wherein the pulley is rotated, causing the shaft to rotate the sleeve element, which causes the external threading of the sleeve element to one of thread into the torsion spring or unthread from the torsion spring while the sleeve element slides in an axial direction along the shaft between the torsion spring and the shaft by rotating the sleeve element around the shaft so as to adjust the amount of contact between the sleeve element and the plurality of coils, and wherein compliance of the adjustable compliance apparatus is adjustable based on a number of the plurality of the coils in contact with the sleeve element as positioned along the shaft within the torsion spring.

* * * * *